United States Patent
Speks

(10) Patent No.: US 9,621,366 B2
(45) Date of Patent: Apr. 11, 2017

(54) NETWORK NODE AND METHOD FOR CONTROLLING RESOURCES IN A COMMUNICATION NETWORK

(75) Inventor: Oliver Speks, Eschweiler (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1683 days.

(21) Appl. No.: 13/140,676

(22) PCT Filed: Dec. 18, 2008

(86) PCT No.: PCT/EP2008/067890
§ 371 (c)(1),
(2), (4) Date: Aug. 26, 2011

(87) PCT Pub. No.: WO2010/069384
PCT Pub. Date: Jun. 24, 2010

(65) Prior Publication Data
US 2011/0307570 A1    Dec. 15, 2011

(51) Int. Cl.
*G06F 9/50*    (2006.01)
*H04L 12/24*    (2006.01)
*G06F 15/173*    (2006.01)

(52) U.S. Cl.
CPC ............... *H04L 12/24* (2013.01); *G06F 9/50* (2013.01); *G06F 9/5027* (2013.01); *G06F 15/17343* (2013.01); *H04L 12/2409* (2013.01); *H04L 41/00* (2013.01); *H04L 41/0893* (2013.01)

(58) Field of Classification Search
CPC .......................................... G06F 9/50–9/5077
USPC ....................................... 709/208, 226, 229
See application file for complete search history.

(56) References Cited

U.S. PATENT DOCUMENTS

| | | | |
|---|---|---|---|
| 6,460,146 B1* | 10/2002 | Moberg | G06F 11/2023 709/222 |
| 6,990,068 B1 | 1/2006 | Saleh et al. | |
| 7,111,297 B1* | 9/2006 | Sankaranarayan | G06F 9/5038 709/223 |
| 2005/0223382 A1* | 10/2005 | Lippett | G06F 9/4812 718/103 |
| 2008/0052394 A1 | 2/2008 | Bugenhagen et al. | |
| 2008/0141264 A1* | 6/2008 | Johnson | G06F 9/455 718/105 |
| 2008/0244227 A1* | 10/2008 | Gee | G06F 1/3203 712/30 |

(Continued)

FOREIGN PATENT DOCUMENTS

EP    1596539 A1    11/2005

*Primary Examiner* — Jeong S Park
(74) *Attorney, Agent, or Firm* — Coats & Bennett, PLLC

(57) ABSTRACT

A network node (10) controls resources (22) in a network. The node (10) includes processing units (12) and assigns, for each set of resources (22), to a unit (12) a master role consisting in reserving and releasing resources (22) and to two processing units (12), named controllers, the role of controlling resources (22). A controller (12*c*) operates in a first mode when a master role is assigned to a processing unit (12*m*) and the unit (12*m*) is available to reserve and release resources (22). A controller (12*c*) operates in a second mode when no master role is assigned or when a master role is assigned to a unit (12*m*) which is not available to reserve and release resources (22). In the second mode, a controller (12*c*) maintains a list (14) of resources (22) to be released and selects a resource (22) from the list (14) to reserve a resource (22).

20 Claims, 11 Drawing Sheets

(56) References Cited

U.S. PATENT DOCUMENTS

2008/0313380 A1* 12/2008 Brown ................ G06F 9/30094
710/311
2009/0083516 A1* 3/2009 Saleem .................. G06F 9/505
712/28

* cited by examiner

= processing unit

= resource

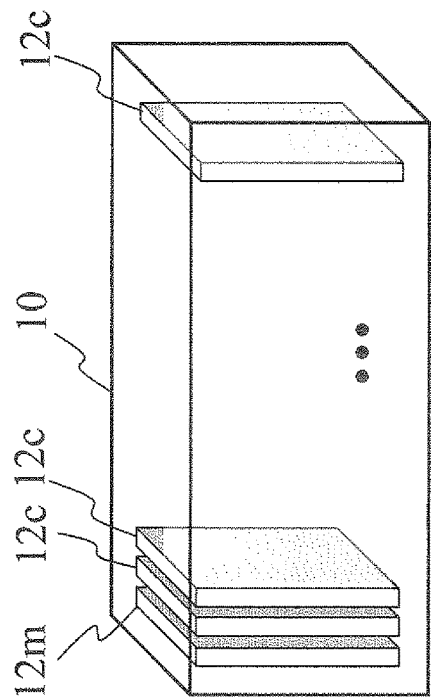
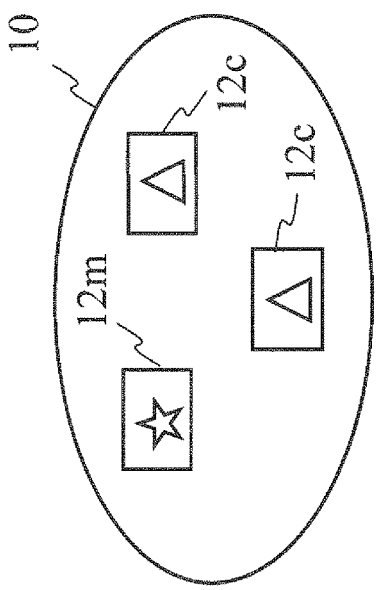
Fig. 3
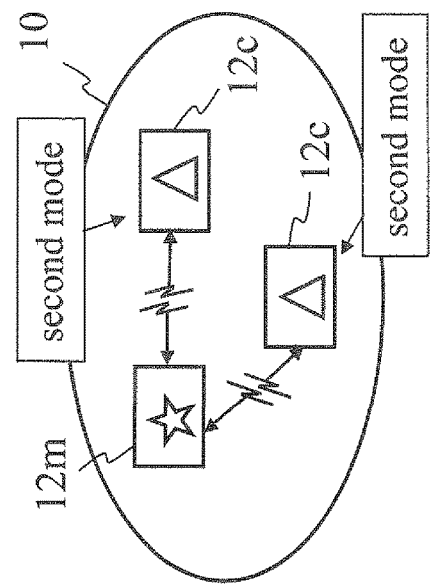
Fig. 4
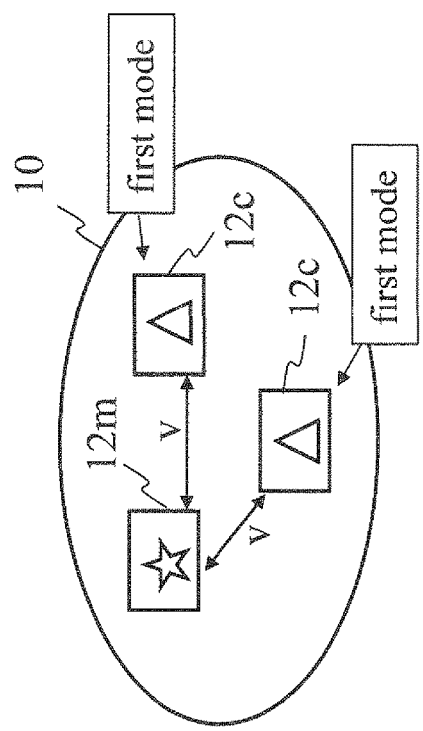
Fig. 5
Fig. 6

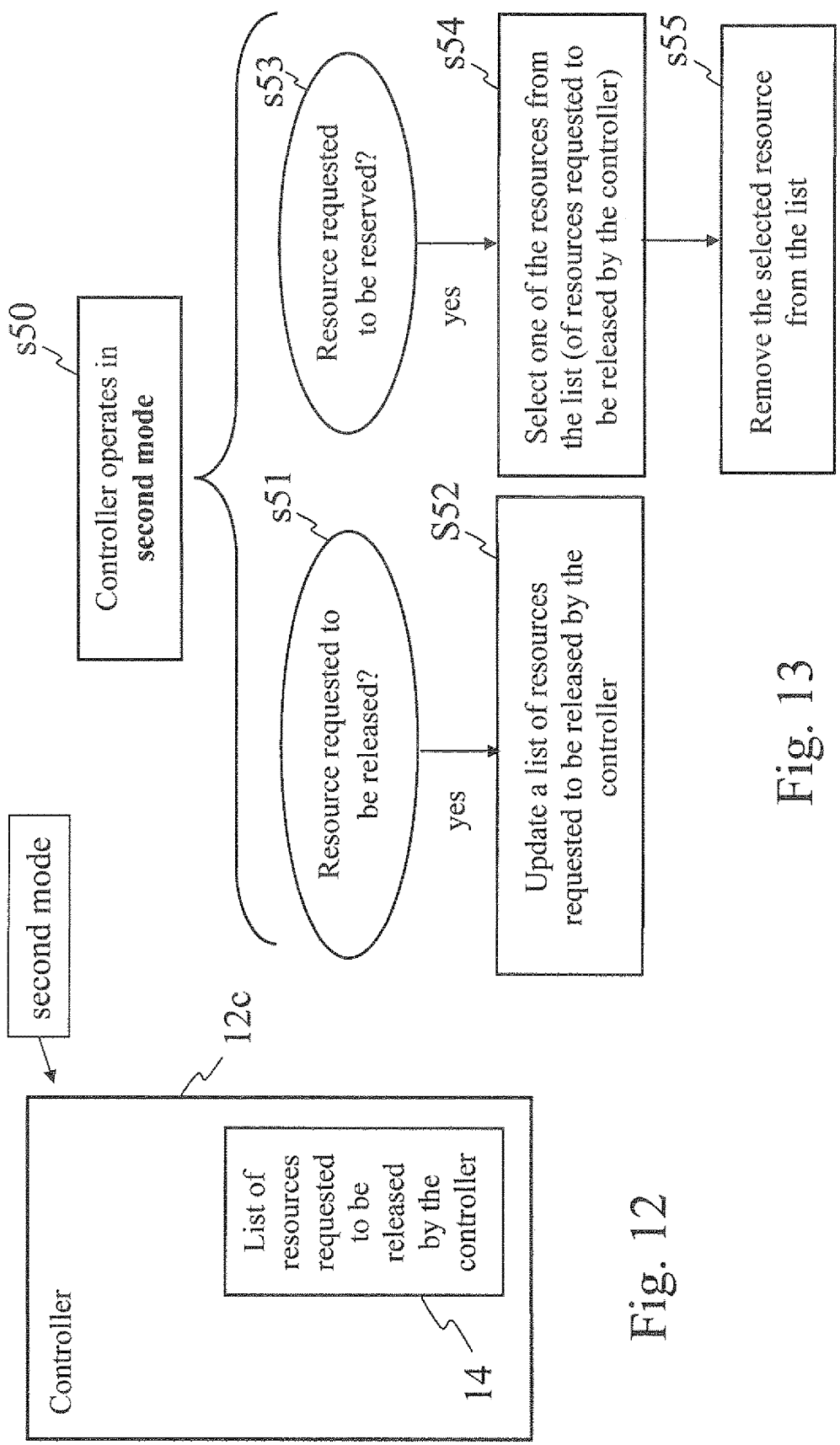

NETWORK NODE AND METHOD FOR CONTROLLING RESOURCES IN A COMMUNICATION NETWORK

TECHNICAL FIELD

The present invention relates to a network node for controlling at least one set of resources in a communication network. It also relates to a method for controlling, by a network node, at least one set of resources in a communication network, and to a computer program comprising instructions configured, when executed on a network node, to cause the node to carry out the above-mentioned method.

BACKGROUND

In communication networks, such as telecommunication networks, a set or pool of resources often need to be shared by several processing units, but cannot necessarily always be partitioned. In this case, a reservation mechanism needs to be set so that the resources are allocated appropriately while avoiding conflicts or underutilization of resources.

In the context of call control for instance, a call often involves, on the one hand, a control plane or signalling plane and, on the other hand, a user plane. The control plane or signalling plane is in charge of establishing and managing a connection between two points on the network. The user plane is in charge of transporting the user data. The resources may for instance be call legs, segments, trunks or slots in the user plane. For instance, media gateways, in charge of switching user data packets in the user plane, may be controlled by call control nodes in the control or signalling plane. The call control nodes are in charge of selecting the media gateway for the call. The call control nodes may be called switching center servers.

There is a constant need to provide network nodes and methods which solve or partially solve the above-mentioned problems of improving the resource control mechanism, notably to avoid conflict or underutilization of resources.

SUMMARY

Such network node and method are defined in the independent claims. Advantageous embodiments are defined in the dependent claims.

In one embodiment, the network node is for controlling at least one set of resources in a communication network. The node includes at least two processing units. The node is configured, for each set of resources, to assign to one of the processing units a role, herein referred to as master role, consisting in reserving and releasing the resources; and to assign to each of at least two of the processing units a role consisting in controlling the resources, each of said at least two of the processing units being herein referred to as controller. Each controller is configured to operate in a first mode when a master role is assigned to one of the processing units and said processing unit is available to reserve and release the resources for the controller. Each controller is also configured to operate in a second mode when no master role is assigned to any one of the processing units or when a master role is assigned to one of the processing units but said processing unit is not available to reserve and release the resources for the controller. Each controller is further configured, when operating in the second mode, to maintain a list of the resources requested to be released by the controller, and to select one of the resources from the list when one resource is requested to be reserved by the controller.

In this embodiment, even when a processing unit to which a master role is assigned cannot be used for reservation and release of resources, the reservation and release of resources can still be carried out, in a mode (the second mode) wherein the controllers operate in an autonomous manner. When no master role is assigned to any one of the processing units or when a master role is assigned to one of the processing units but said processing unit is not available to reserve and release the resources for a controller, the controller operates in the second mode. In the second mode, the controller maintains a list of the resources to be released and reuses resources from the list if a resource has to be reserved. The list is specific to the controller operating in the second mode.

The operational continuity and service performance of the node is thus improved, the resource downtime is reduced, conflicts in the reservation of resources are avoided or at least reduced, and the underutilization of resources is minimized or at least reduced.

A communication network may herein be any network used for data communication, such as a core network within a mobile communication network, or a fixed telephony communication network. The resources may be nodes through which the data packets or streams are routed or switched. In one embodiment, the communication network is any one of a circuit-switched core network, a packet-switched core network, a circuit-switched core network for ATM and/or IP transport, a circuit-switched core network in a GSM and/or UMTS environment, and a packet-switch network.

In one embodiment, the network node is a computer server. In one embodiment, the network node is a blade cluster. This will be explained and illustrated in more details in the detailed description with reference to the drawings.

The case where no master role is assigned to any one of the processing units may occur notably when the master role is being moved or migrated from one processing unit to another processing unit. During this time, the master role is vacant. A migration may be caused by the automatic rebalancing of the master roles associated with the different sets of resources due notably to the addition of one processing unit to the network node when the added processing unit becomes eligible for hosting master roles.

Herein, the expression "a master role is assigned to one processing unit for one set of resources" (or the like) has the same meaning as "one processing unit hosts a master role for one set of resources" (or the like).

The case where a processing unit to which a master role is assigned is not available to reserve and release resources for the controller may occur in the following circumstances (non-exhaustive list of possibly overlapping cases): (1) the processing unit to which the master role is assigned is not serving properly; (2) the processing unit to which the master role is assigned is being restarted (e.g. planned or manually initiated reboot, or reboot caused by a recovery action); (3) the processing unit to which the master role is assigned cannot be reached by the controller; and (4) the processing unit to which the master role is assigned is not ready to receive service requests.

For one set of resources, the master role is assigned to one processing unit only, but a processing unit hosting the master role may also host, simultaneously, the role of controller, i.e. a controller role.

The network node is configured to assign to one of the processing units a master role and to assign to each of at least two of the processing units a controller role. However, at one point in time in operation (notably temporarily or accidentally), there may be no processing unit hosting a master role. A case where this may happen has been explained above.

Also, at one point in time in operation (notably temporarily or accidentally), there may be less than two processing units hosting a controller role. This may happen if the network node includes one processing unit only. In this case, the network node may nevertheless be configured to assign a master role and a controller role to the processing unit. This provides the advantage of a smooth transition as soon as a second processing unit is available (proactive measure for smooth scalability). This may also happen if the network node includes at the least two processing units but only one of them hosts a controller role, for instance because the other processing unit(s) is/are busy with other processes. This also provides the advantage of a smooth transition as soon as a second processing unit is available to act as controller (proactive measure for smooth scalability). If, permanently, only one processing unit hosted the controller role, the controller and master role functionalities could be merged, without the need for a controller/master mechanism.

The master role includes the role of reserving and releasing the resources, for one set of resources. In one embodiment, the set of resources comprises all the resources controlled, or controllable, by the network node. In another embodiment, the set of resources comprises a portion of all the resources controlled, or controllable, by the network node. In one embodiment, the master role includes the role of keeping track of the occupancy status of the resources (for the set of resources).

In one embodiment, the network node is a switching center in a signalling plane of the communication network, for controlling at least one set of resources in a user plane of the communication network.

The signalling or control plane is a protocol or set of protocols and mechanisms, and by extension the network nodes implementing these mechanisms, for setting up and managing a connection, such as for instance for providing mobility management.

The user plane is a protocol or a set of protocols and mechanisms, and by extension the network nodes implementing these mechanisms, for transporting the user data. In one embodiment, the user plane implements the bearer functionality, such as for instance for providing the bearer control and transmission resources functions.

In one embodiment, the resources are physical carriers. Physical carriers are communication channels or circuits in the OSI/ISO or TCP/IP physical layer for instance, such TDM (channels of E- or T-carrier), ATM, and IP.

In one embodiment, the resources are circuits or channels of a circuit-switched bearer network. A circuit-switched bearer network is a network wherein circuit-switched connections between at least two parties are provided, such as for instance a calling party and a called party. The connection may be set up to transmit voice, data, video frames, or any other type of data. The signalling protocols through which the circuits or channels of a circuit-switched bearer network may be controlled include (non-exhaustive): BSSAP, DSS.1, ISUP (ISDN User Part, specified by the ITU-T as part of the Q.76x series), TUP, and BICC.

In one embodiment, the network node includes a blade cluster including the at least two processing units, wherein each processing unit is a blade of the blade cluster. In particular, each blade of the blade cluster may further include at least one memory unit. In this case, the list may be stored on the at least one memory unit.

In one embodiment, each controller is further configured, when operating in the second mode, to remove the selected resource from the list after having selected one resource from the list. Therefore, the controller is configured to easily and accurately keep track of the resources which are still available for selection in the second mode while avoiding resource reservation conflicts.

In one embodiment, each controller is further configured, when operating in the second mode and when detecting that a master role is assigned to one of the processing units and that said processing unit is available to reserve and release the resources for the controller, to send, to the processing unit to which the master role is assigned, a release request, with respect to each one of the resources in the list, and to remove the resource from the list.

In this embodiment, therefore, the controller is configured to transition back from the second mode to the first mode while avoiding potential underutilization of resources after transition. By transmitting, from the controller to the processing unit hosting the master role, a release request for each entry in the list (i.e. the list maintained by the controller when operating in the second mode), the reservation state of the resources is efficiently updated, centrally, when the controller returns to the first mode, with master role assigned and available.

Embodiments described in particular thereafter may comprise a network node including at least three processing units, at least eight processing units, at least 16 processing units, between 16 processing units and 128 processing units, or any other number of processing units (or, in an embodiment, blades).

The invention also relates, in one embodiment, to a method for controlling, by a network node, at least one set of resources in a communication network. The node includes at least two processing units. The method includes an assigning procedure for assigning, by the node, for each set of resources, to one of the processing units a role, referred to as master role, consisting in reserving and releasing the resources; and to each of at least two of the processing units a role consisting in controlling the resources, each of said at least two of the processing units being herein referred to as controller. The method is such that each controller operates in a first mode when a master role is assigned to one of the processing units and said processing unit is available to reserve and release the resources for the controller. The method is also such that each controller operates in a second mode when no master role is assigned to any one of the processing units or when a master role is assigned to one of the processing units but said processing unit is not available to reserve and release the resources for the controller. The method is also such that each controller, when operating in the second mode, maintains a list of the resources requested to be released by the controller, and selects one of the resources from the list when one resource is requested to be reserved by the controller.

The invention further relates, in one embodiment, to a computer program comprising instructions configured, when executed on a network node, to cause the node to carry out the above-Mentioned method or any one of the embodiments of said method. The invention also relates to a computer-readable medium comprising such a computer program.

BRIEF DESCRIPTION OF THE DRAWINGS

Embodiments of the present invention shall now be described, in conjunction with the appended figures, in which:

FIG. 3 schematically illustrates a network node with master and controller roles assigned to processing units, in one embodiment of the invention;

FIG. 4 schematically illustrates an example of implementation of a network node with blades including the processing units, in one embodiment of the invention;

FIGS. 5 to 10 schematically illustrate embodiments of network nodes with an indication of the mode wherein the controllers are operating, depending on the specific illustrated situation, in embodiments of the invention;

FIG. 12 schematically illustrates a controller capable of operating in the second mode, in one embodiment of the invention;

FIG. 13 is a schematic flow chart of the operation of a controller in the second mode, in one embodiment of the invention;

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
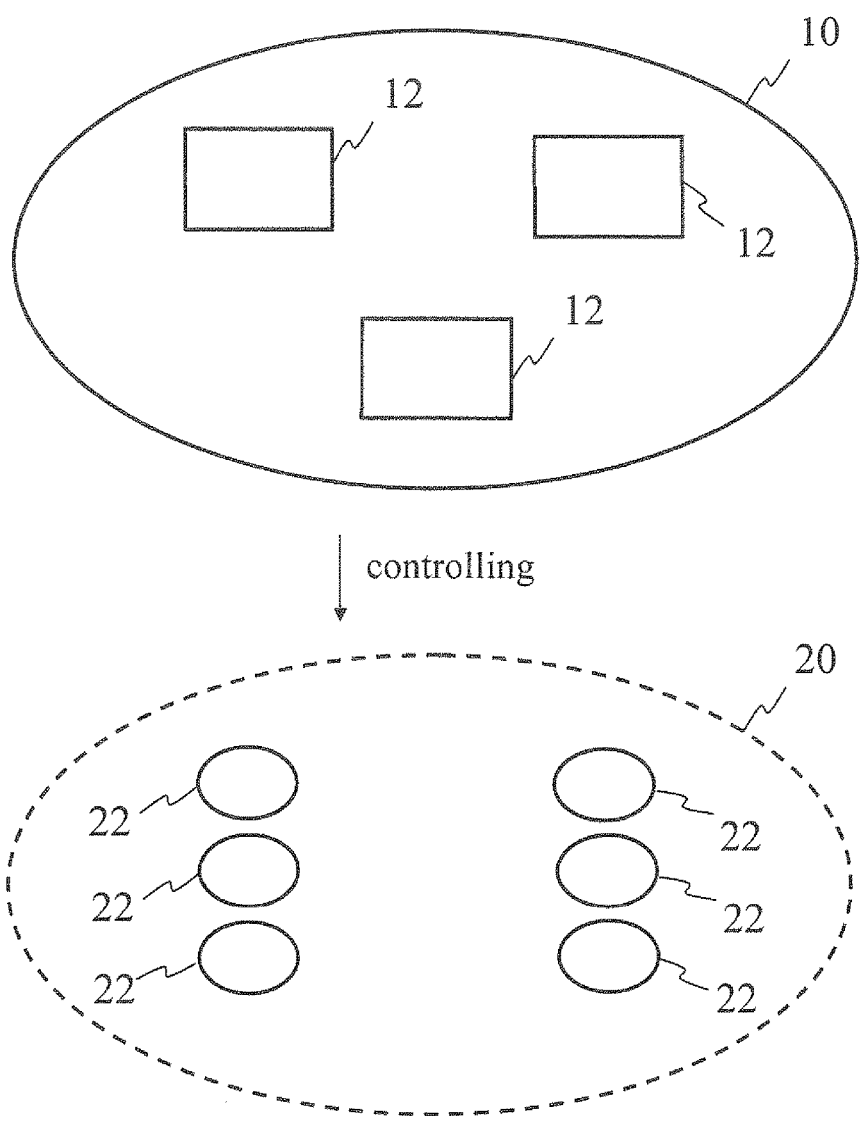
FIG. 1 schematically illustrates a network node and a set of resources in one embodiment of the invention.

FIG. 1 schematically illustrates a network node 10 including three processing units 12. The network node 10 is depicted by a large plain ellipse. The processing units 12 are depicted by small plain squares. The processing units 12 are configured to control a set 20 of resources 22. The set 20 is depicted by a large dotted ellipse. The resources 22 are depicted by small plain ellipses. The resources 22 lie in the communication network (not illustrated).

The number of processing units 12 in the network node 10 may be different than three. Notably, there may be two, four, five or more processing units 12 in the network node 10. Likewise, the set 20 is depicted as including six resources 22. More or less than six resources 22 may be used.

The control by the processing units 12 of the resources 22 includes managing the properties of the resources 22, activating or deactivating a resource, in such manner that, for instance, the resources 22 may be used in the communication network to assist the transfer of data from one point to another point in the network. The resources 22 may be hardware or software resources, including physical communication ports, slots in a time division multiplexing communication system, frequencies in a frequency division multiplexing system, codes in a code division multiplexing system, etc.

Figure 2:
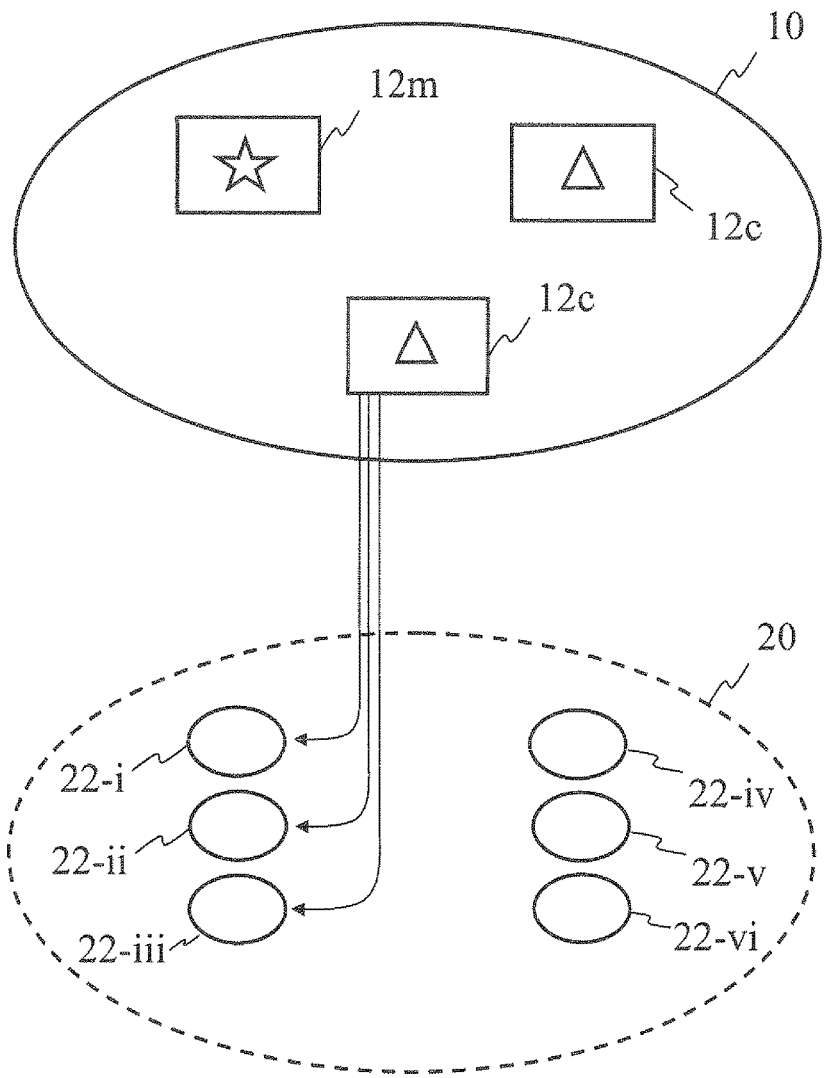
FIG. 2 schematically illustrates the network node and the set of resources of FIG. 1, with a master role assigned to a processing unit and controller roles assigned to other processing units, in one embodiment of the invention.

FIG. 2 schematically illustrates the network node 10 and the set 20 of resources 22 of FIG. 1, wherein roles are assigned to the processing units 12. A processing unit 12m to which a master role has been assigned is depicted with a star thereon. A processing unit 12c to which a controller role is assigned is depicted with the triangle. The network node 10 includes a processing unit 12m hosting a master role, and two processing units 12c each hosting a controller role. The processing units 12c each hosting a controller role are herein referred to as controllers. A processing unit 12 may simultaneously host a master role and a controller role. Such a processing unit 12 will be referred to by the reference sign "12mc", as will be apparent with reference to FIG. 8.

One of the two controllers 12c is depicted in FIG. 2 as controlling three resources 22-i, 22-ii, 22-iii. The other resources 22-iv, 22-v, 22-vi are not depicted as being controlled by any controller 12c. In the first mode, the processing unit 12m hosting the master role keeps track of the resources 22 which are currently reserved, so that, for instance, if one controller 12c needs to reserve a resource 22, the processing unit 12m can reserve for the controller 12c a resource 22, such as the resource 22-iv.

FIG. 3 schematically illustrates a network node 10, without depicting, for the sake of clarity and conciseness, the resources 22 which are controlled or controllable. The network node 10 illustrated in FIG. 3 essentially corresponds to the control node 10 illustrated in FIG. 2. This type of representation of the network node 10 and the processing unit 12 included therein will be used in FIGS. 5 to 10 to illustrate different types of situations and the corresponding modes in which the controllers 12c operate.

Before turning to FIGS. 5 to 10, it should be noted that FIGS. 1 to 3 and 5 to 10 are schematic representations of network nodes. A possibly more realistic representation of a network node 10 is depicted in FIG. 4, which is still schematic to a large extent but shows that the processing units 12 may each be on one blade of a blade cluster. A blade may be removed or added to provide scalability to the network node 10.

FIG. 5 illustrates a network node 10 including a processing unit 12m hosting a master role and two controllers 12c. As illustrated by the double-headed arrows labelled with a "v" from each one of the controllers 12c to the processing unit 12m hosting the master role, the processing unit 12m hosting the master role is available to reserve and release resources 22 for both controllers 12c. Therefore, both controllers 12c operate in the first mode.

FIG. 6 illustrates, schematically, another situation within a network node 10. By comparison to the situation illustrated in FIG. 5, in the situation of FIG. 6, although a master role is assigned to one processing unit 12m, said processing unit 12m is not available to reserve and release resources 22 for the controllers 12c. This may be for instance caused by a reboot of the processing unit 12m hosting the master role. In this case, both controllers 12c operate in the second mode.

Figure 7:
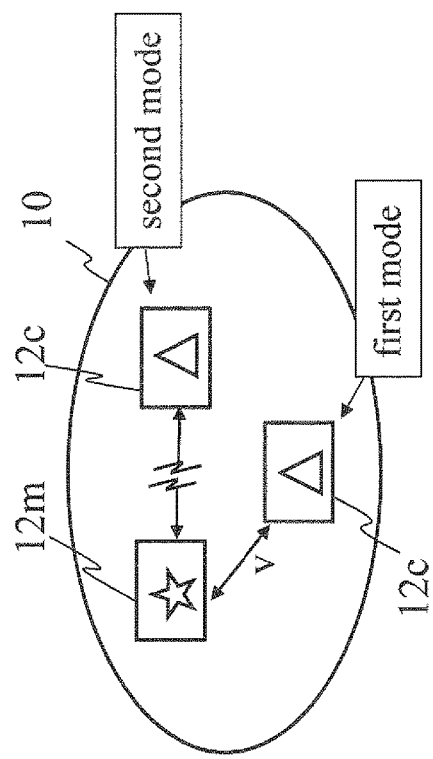

By comparison to the situations of FIGS. 5 and 6, in the situation illustrated in FIG. 7, the processing unit 12m hosting the master role is available to reserve and release resources 22 for one of the controllers 12c, but not for the other controller 12*c*. Therefore, in this case, one of the controllers 12*c* operates in the first mode, while the other one operates in the second mode.

Figure 8:
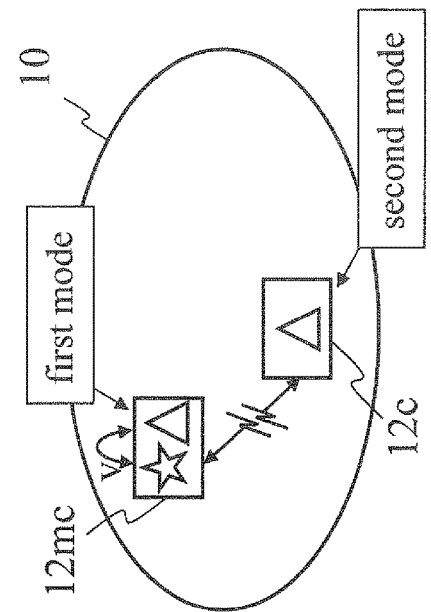

In the situation illustrated in FIG. 8, the network node 10 includes two processing units 12. One processing unit 12*mc* simultaneously hosts a master role and a controller role. The other processing unit hosts a controller role and is therefore a controller 12*c*. The master role hosted on the processing unit 12*mc* is available to reserve and release resources 22 for controller functions hosted on the same processing unit 12*mc*. This is illustrated in FIG. 8 by the double-headed arrow labelled with "v". In contrast, the master role is not available to reserve and release resources 22 for the controller 12*c* depicted at the bottom of the network node 10 in FIG. 8. The controller 12*mc* thus operates in a first mode, while the controller 12*c* operates in the second mode.

Figure 9:
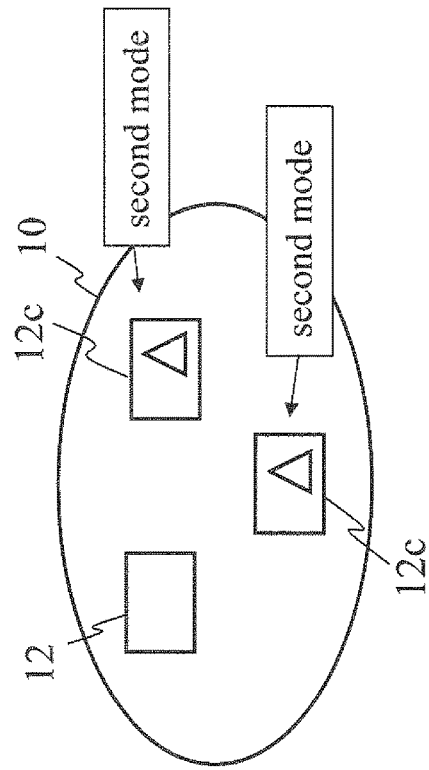

In the situation illustrated in FIG. 9, two controllers 12*c* are depicted, but no master role is assigned to any one of the processing units 12. The two controllers 12*c* thus operate in the second mode.

Figure 10:
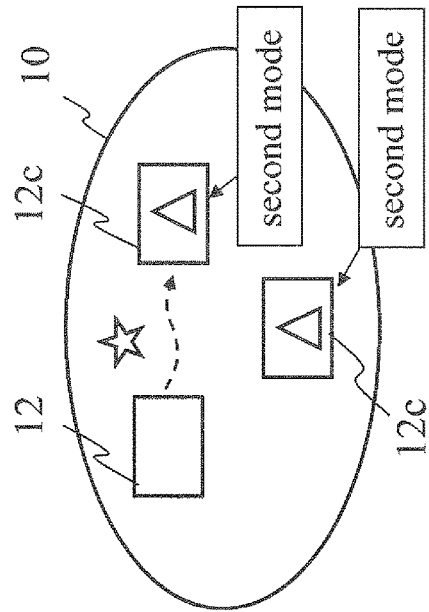

In the situation illustrated in FIG. 10, two controllers 12*c* exist, but no master role is assigned to any of the processing units 12. The S-shaped doted arrow toped by the star illustrates the cause of the situation, which is that the master role migrates from one processing unit 12 to another processing unit 12*c*.

Figure 11:
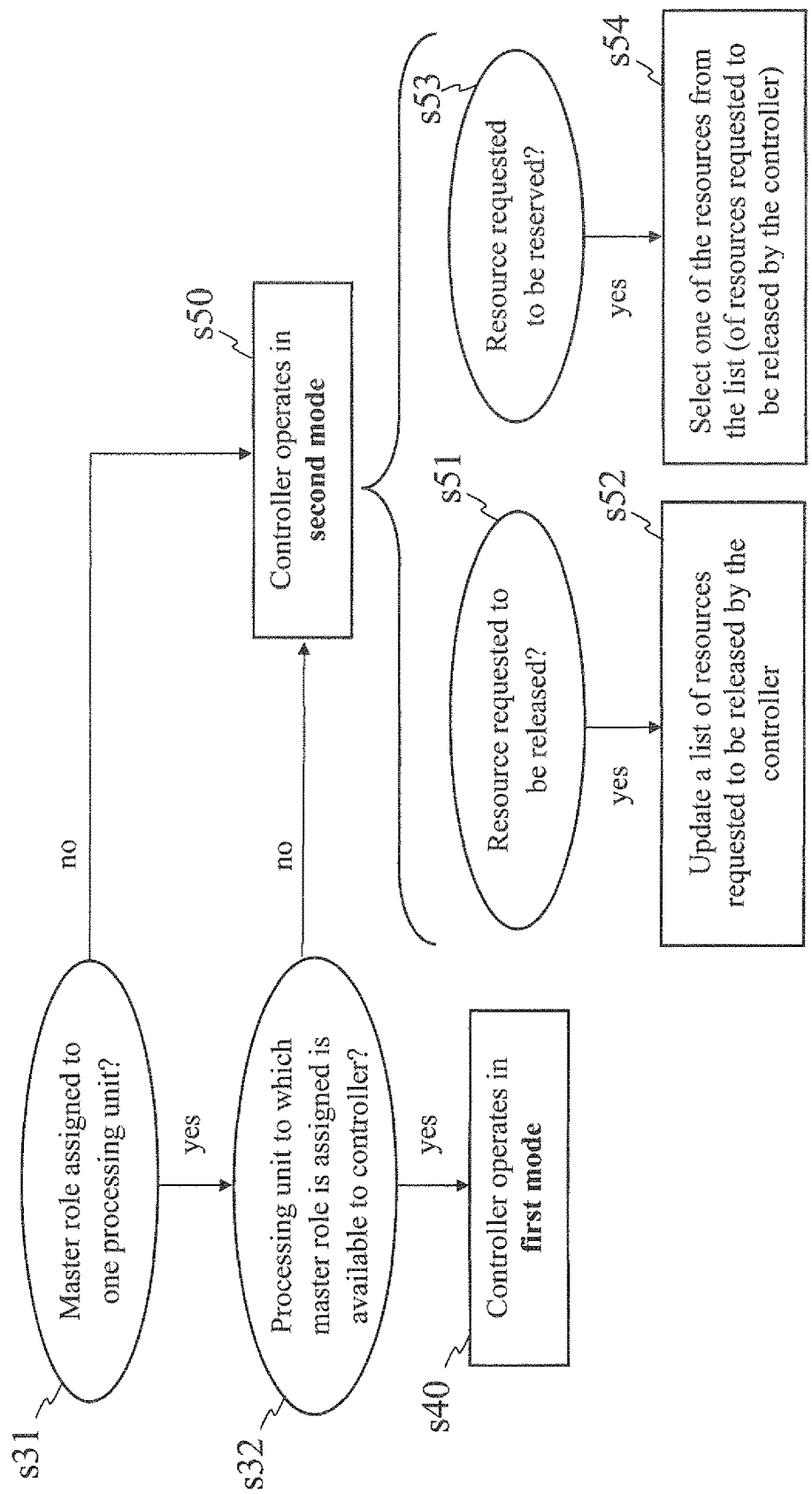
FIG. 11 is a schematic flow chart of the operation of a controller in one embodiment of the invention.

FIG. 11 is a schematic flow chart showing how a controller 12*c* is configured to operate in one embodiment of the network node 10 of the invention. FIG. 11 also illustrates the steps performed by a controller 12*c* in an embodiment of the method of the invention.

The controller 12*c* is configured to act as follows. The controller 12*c* determines s31 whether a master role is assigned to one processing unit 12. If no master role is assigned to any processing unit 12 (arrow labelled "no"), the controller 12*c* operates s50 in the second mode. If a master role is assigned to one processing unit 12 (arrow labelled "yes"), the controller 12*c* determines s32 whether the processing unit 12*m* to which a master role is assigned is available to the controller 12*c*. If this processing unit 12*m* is not available to the controller 12*c* (arrow labelled "no"), the controller 12*c* operates s50 in the second mode. In contrast, if the processing unit 12*m* to which the master role is assigned is available to the controller 12*c* (arrow labelled "yes"), the controller 12*c* operates s40 in the first mode.

In the first mode, the controller 12*c* interacts with the processing unit 12*m* to which the master role is assigned in order to reserve and release resources 22. The first mode may include more steps than the steps for reserving and releasing resources 22.

In the second mode, still referring to FIG. 11, if a resource 22 is requested to be released s51, the controller 12*c* updates s52 a list 14 of resources 22 requested to be released by the controller 12*c*. In other words, the controller 12*c* maintains a list 14 of resources 22 requested to be released, locally. Still in the second mode, if the controller 12*c* requests s53 to reserve a resource 22, the controller 12*c* selects s54 one of the resources 22 from the list 14 (of resources requested to be released by the controller 12*c*). The selection s54 of a resource 22 from the list 14 is not restricted to any particular method. In one embodiment, a FIFO selection may be used, which provides a circular selection.

FIG. 12 schematically illustrates a controller 12*c* maintaining, when operating in a second mode, a list 14 of resources 22 requested to be released by the controller 12*c*. This list 14 may be stored in a non-volatile or volatile memory storage unit. The list 14 may be an ordered or non-ordered collection of resource identifiers. If the controller 12*c* is hosted on a blade, the list 14 may be said as containing a blade-local pool of resources.

FIG. 13 is a schematic flow chart of the operation of a controller 12*c*, when operating s50 in the second mode. The steps depicted in FIG. 13 correspond to those of the second mode operation in FIG. 11, except that, when requesting s53 a resource 22 to be reserved, the controller 12*c* not only selects s54 one of the resources 22 from the list 14 (of resources 22 requested to be released by the controller 12*c*), but also removes s55 the selected resource 22, or more specifically an identifier thereof, from the list 14. As mentioned above, this enables the controller 12*c* to easily and accurately keep track of the resources 22 which are still available for selection in the second mode while avoiding resource reservation conflicts.

Figure 14:
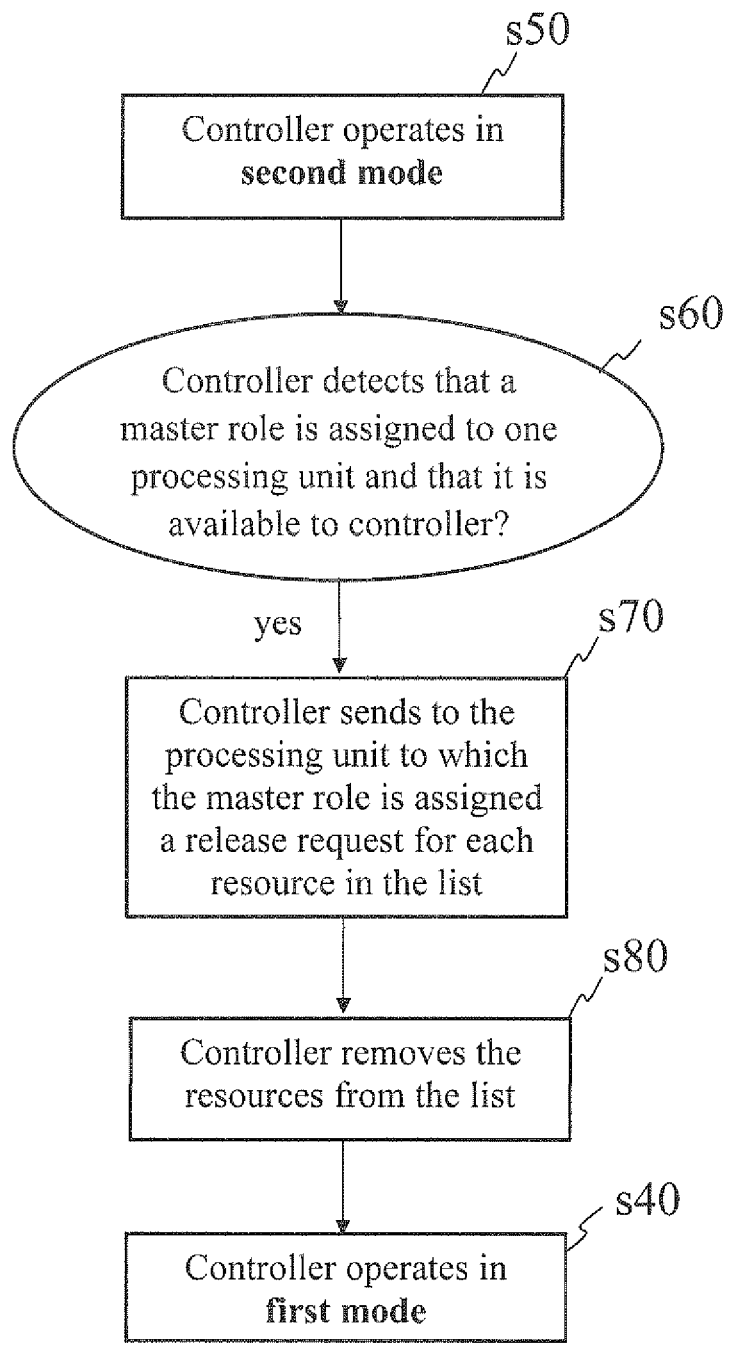
FIG. 14 is a schematic flow chart of the operation of a controller transiting from the second mode to the first mode, in one embodiment of the invention.

FIG. 14 is a schematic flow chart showing the transition of a controller 12*c* from the second mode to the first mode, and the steps associated therewith. If, when the controller 12*c* operates s50 in the second mode, it detects s60 (e.g. by receiving an inter-processing-unit or inter-blade notification) that a master role is assigned to one processing unit 12*m* and that this processing unit 12*m* is available to the controller 12*c* (i.e. available to reserve and release resources 22 for the controller 12*c*), the following occurs. The controller 12*c* sends s70, to the processing unit 12*m* hosting the master role, a release request for each resource 22 in the list 14. The controller 12*c* then removes s80 the resource 22 from the list 14. This terminates the transition in a state where the controller 12*c* may operate s40 in the first mode.

Embodiments of the invention will now be described in the context of circuit selection in a telephony blade cluster.

As mentioned as an example in the background section, call control nodes called switching center servers, in the control or signalling plane, may be used to control resources 22 in the user plane. As also mentioned above, such switching center servers should preferably be scalable.

A possible architecture for such signalling plane system is a blade cluster structure. A blade cluster structure is made of an enclosure (or chassis) including a plurality of servers or blades (also called cards or boards) in a dense configuration (for instance 16, 32, 64 or 128 blades in one enclosure). It is typically made up of a processor (processing unit), a volatile memory, networking capabilities and a non-volatile storage (e.g. flash memory or small hard disk). The cluster enclosure provides the bulky elements and services such as power supply, and cooling. Although a blade comprises more than just a processing unit, for the sake of simplicity herein, both the blades and the processing units of the blades are herein designated by the same reference numeral 12, and no distinction is made between a blade and a processing unit in the drawings and the following description. The terms are used interchangeably, although in reality a blade comprises more elements than just a processing unit.

A blade cluster structure provides flexibility (a blade 12 is usually designed to be easily removed—possibly in runtime—from or added to the structure, without interfering with the other blades 12), space saving (blade enclosure provides the bulky hardware elements) and improved manageability (a blade 12 can operate independently).

In these embodiments (circuit selection in a telephony blade cluster), transmission lines that carry payload (in the user plane) are terminated in media gateways (MGw) (see also for instance section 5.1.1.3 of 3GPP TS 23.205 V7.5.0 (2007-06), 3rd Generation Partnership Project; *Technical Specification Group Core Network and Terminals; Bearer-independent circuit-switched core network*; Stage 2 (Release 7) available from the 3GPP, Sophia Antipolis, France). The switching of these resources is controlled by the switching center server, e.g. media switching center server (MSC-Server, see also for instance above-referred TS 23.205 V7.5.0, section 5.1.1.1).

Time division multiplex (TDM) terminations (see also for instance ITU-T Rec. H.248.1 (09/2005) "*SERIES H: AUDIOVISUAL AND MULTIMEDIA SYSTEMS, Infrastructure of audiovisual services—Communication procedures, Gateway control protocol*: Version 3", section 6.2) are not necessarily well suited to be controlled by a blade cluster system because neither the call control signaling nor the MGw control signaling provides support for a multi-blade architecture. Before a termination can be used for a call, coordination of exclusive usage must be performed between the switching center (SC) blades. A termination is a type of resource in a communication network. The terminations are administratively associated uniquely with circuit identification codes (CIC), which are used by call control signalling protocols (in ISUP for instance, each timeslot between two switches is uniquely identified by a circuit identification code (CIC) that is included in the ISUP messages). Signalling messages need to be routed to the blade that handles the respective call.

Ephemeral terminations are better suited to a multi-blade architecture. The seizure of terminations is coordinated by the MGw. There is no need for inter-blade coordination on the switching center server (SC-S) side. Signaling messages need to be routed to the blade that handles the respective call. The Bearer Independent Call Control protocol (BICC) uses ephemeral terminations but requires coordination of call instance codes (CIC) on the SC-S side, since they are a common resource of all blades.

How to maintain a common pool of call instances codes (CICs) and how to assign them to call control functions on any blade may be described as follows.

Figure 15:
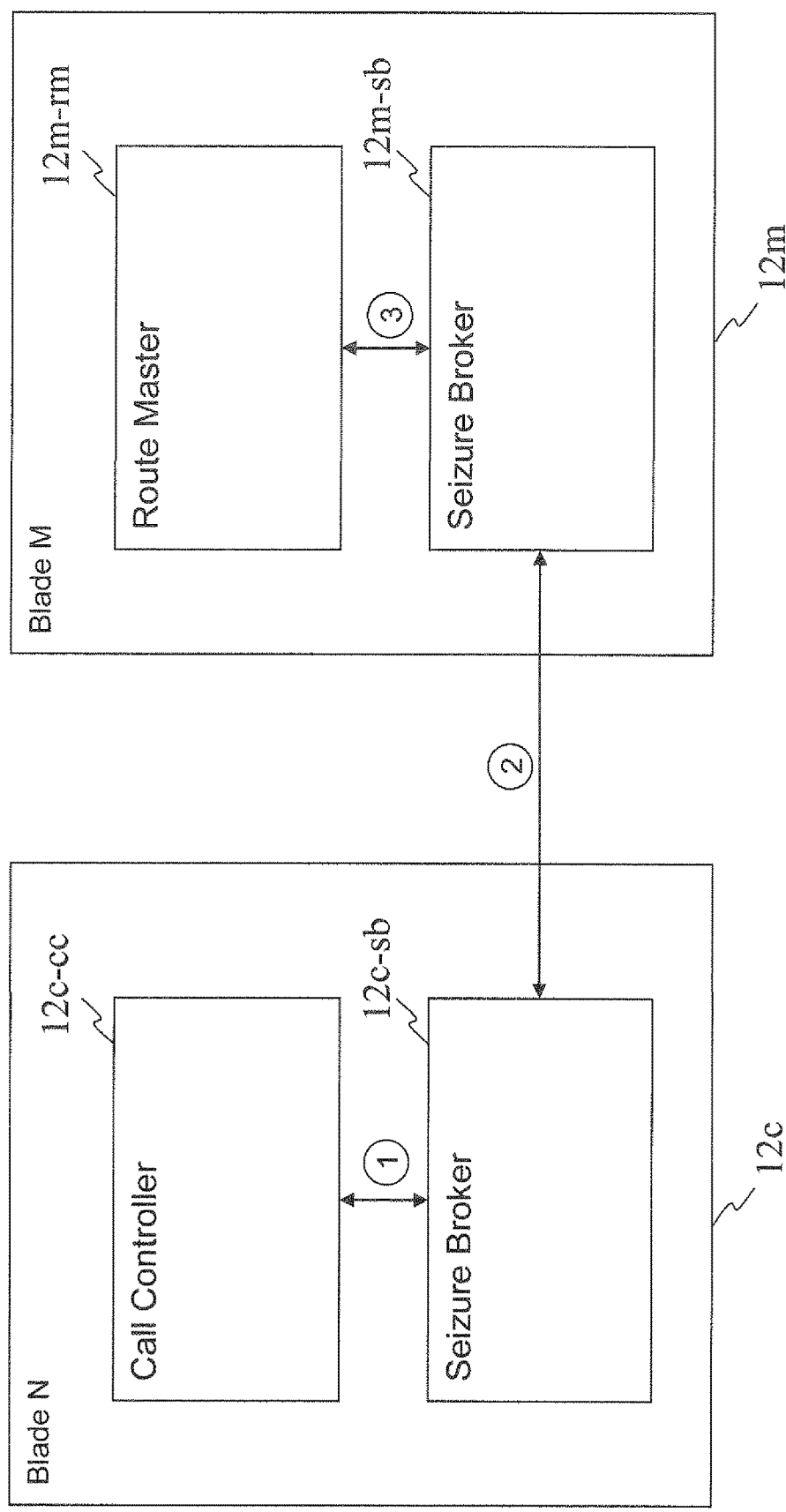
FIG. 15 schematically illustrates a controller (blade N) interacting with a blade (blade M) hosting a master role, when the controller operates exclusively in a first mode, to better understand the context of embodiments of the invention and the problems addressed by embodiments of the invention.

FIG. 15 illustrates the functional entities for CIC handling, if a first mode was used (i.e. without the second mode of the invention) to better understand the context of the invention and the problems arising from not using a second mode.

For each call, the call control functionality is assigned to one of the blades 12 in the cluster. The blade or processing unit to which the call control functionality, is assigned is a controller 12*c* (labelled "Blade N" in FIG. 15). The call controller 12*c-cc*, which is a component of a controller 12*c*, is configured to seize a CIC (which is a resource 22) at call initiation and to release the CIC when the call is terminated. A centralized pool of CICs belonging to one destination (route) is maintained by a route master 12*m-rm*. The master role is assigned to one of the blades (labelled "Blade M"), i.e. blade 12*m* or processing unit 12*m*. The route master 12*m-rm* is a component of the blade 12*m*.

The call controller 12*c-cc* transmits seizure and release requests to a seizure broker 12*c-sb* that is co-located on the same blade 12*c*. Herein, seizure of a resource and reservation of a resource have the same meaning. The call controller 12*c-cc* receives any reply from the seizure broker 12*c-sb*. This interface is depicted by the surrounded label "1" in FIG. 15. Seizure brokers 12*c-sb* on all blades 12*c* communicate through an intra-blade protocol (as depicted by the surrounded label "2") with the seizure broker 12*m-sb* on the blade 12*m* hosting the master role. The seizure broker 12*m-sb* communicates with the route master 12*m-rm* (as depicted by the surrounded label "3"). The route master 12*m-rm* serves the seizure and release request received from the other blades through the co-located seizure broker 12*m-sb*.

The so-called selection type determines which procedure is to be followed when a free resource is selected for a route when setting up a new call.

For ISUP and BICC circuits, the trunk signalling systems ISUP and BICC support seizure of circuits from both peers. Dual seizure is a network condition where both ends of a connection have sent a message to the peer trying to seize, i.e. reserve, the same CIC. A dual seizure is detected by an exchange from the fact that it receives an initial address message (IAM) for a circuit for which it has sent an initial address message, but before it receives a valid backward message. In order to reduce the likelihood of dual seizure, the selection type should be specified in a coordinated way for both communicating peers. For example, on one side, idle circuits are searched from the highest CIC number downwards and from the other side idle circuits are searched from the lowest CIC number upwards.

Resolving a dual seizure condition requires significant extra processing and signaling capacity. The likelihood of a dual seizure should therefore be kept as low as possible.

The table below shows the major selection types, which are used in the example of FIG. 15 (first mode).

| Circuit selection type | ISUP (24ch) | ISUP (32ch) | BICC |
|---|---|---|---|
| ITU-T method 2 (Random selection). | x | x | |
| ITU-T method 1 (Sequential selection), forward/backward search. Forward/backward search means that a search for an idle device in the route is started from the lowest/highest device number. | x | x | |
| CIC-based Circular selection, forward/backward search. Forward/backward search means that a search for an idle device in the route is started from current position and executed towards higher/lower CIC number. | | x | |
| CIC-based Sequential selection starting at lowest/highest CIC. Search for an idle device in the route is started from the lowest/highest CIC number. | x | x | x |

These methods prevent dual seizures unless the route is nearly congested.

In the context of A-interface circuits (the A-interface is the GSM signal interface between a base station controller (BSC) and a mobile switching center (MSC)), for BSSMAP routes (BSSMAP stands for Base Station System Management Application Part, a protocol used to convey control information between the MSC and the BSS (base station system)), the selection type is not administrable. Free devices are found by means of a first-in-first-out (FIFO) idle list. On the A-interface circuits are always selected by the MSC-S, never by the BSC. Therefore, no collision risk exists.

In the context of primary rate access (PRA) B-channels (a B-channel is a ISDN channel wherein the primary data or voice communication is carried), for PRA originating calls, the user can indicate one of the following options in the SETUP message:

Channel is indicated, no acceptable alternative. In this case, the SC grants the indicated channel. If that one is not available, SC disconnects the call.

Channel is indicated, any alternative is acceptable. In this case, if the network cannot grant the preferred channel, it selects any other available B-channel associated with the D-channel (a D-channel is a ISDN channel in which control and signaling information is carried).

Any channel is acceptable (default option). In this case, the SC selects any available channel associated with the D-channel.

Still in the context of PRA B-channels, but for PRA terminating calls, the network can indicate one of the following options in the SETUP message:

Channel is indicated, no acceptable alternative. In this case, if the indicated channel is acceptable and available, the user selects it for the call.

Channel is indicated, any alternative is acceptable. In this case, if the indicated channel is acceptable and available, the user selects it for the call. If the user cannot grant the indicated channel, it selects any other available B-channel associated with the B-channel and identifies that channel in the channel identification information element as "channel is indicated, no acceptable alternative" in the first message sent in response to the SETUP message. If the B-channel indicated in the first response message is unacceptable to the SC, it clears the call.

No B-channel available (only in relation to supplementary services)

Channel selection conflicts may occur if a PRA originating and PRA terminating call select the same channel. In case of such conflicts, the network gives priority to the PRA terminating call over the PRA originating call request. It clears the PRA originating call whenever the B-channel cannot be allocated by the network or accepted by the user originating the call.

In the context of line hunting (hunting, or a hunt group, is methodology of distributing phone calls from a single telephone number to a group of several phone lines, from http://en.wikipedia.org/w/index.php?title=Line_hunting&oidid=245820 717, Line hunting, visited Dec. 15, 2008) for PBX (private branch exchange), the line and trunk hunting supplementary services apply to a group number (GN) and enable the automatic selection of a free device (B-channel, BCH) related to a terminating call, within the hunt groups (HG) belonging to this GN. In particular, line hunting service is intended for use on accesses to which terminals are connected.

This supplementary service is defined by hunting methods on two different levels: GN level and HG level. Each GN instance is defined by several data: one of this data defines the hunting type that determines the order in which the HGs are hunted. Three different hunting types are available on this level: sequential, cyclic and pseudorandom.

If sequential hunting is set, the scanning follows a fixed order (previously defined by command). The search is stopped for that GN when an idle BCH is found inside the selected HG or when no other HGs are available to be scanned.

If cyclic hunting is set, the HG selection starts from the HG after the one used last. The fixed order is followed as sequential hunting and the scanning is stopped when a free BCH is found or the starting HG record is pointed again.

If pseudorandom hunting is set, a sequential search is performed (just as for cyclic and sequential hunting) but the starting point is randomly chosen every time.

Similarly to the GN, each HG connected to a GN is defined by several parameters. One of them is the hunting type parameter that determines the order in which the BCHs are hunted. Four different hunting types are available on this level: sequential, uniform, cyclic and pseudo random.

If sequential hunting is set, the scanning follows a fixed order defined by an Hunting Number (HNB) assigned to the LBCH (logical B-channel, a term used to identify circuits for ISDN access) previously defined by command. A check on the BCH state is needed in the access file: if idle it is seized and used in the call process. The scanning is stopped for that HG when an idle BCH is found or when the first LBCH in the fixed list is pointed again (no idle BCH has been found in that HG).

When cyclic hunting is set, a sequential search should be conducted over the BCHs of the HG starting from the last seized BCH plus one. The fixed order is followed as sequential hunting and the scanning is stopped when a free BCH is found or the starting record is pointed again.

When pseudo random hunting is set, a sequential search is performed (just as for cyclic and sequential hunting) but the starting point is randomly chosen every time.

If uniform hunting is set, the BCH which has been free for the longest time is selected. Therefore, an idle list related to that HG is also created in the LBCH file: all idle BCHs allocated to this HG are included in this list. During the scanning on HGs with this hunting type, the related idle list is scanned and the check on the BCH state is anyway performed since this check ensures that the BCH is "booked" and prevents collision situations, e.g. the BCH is seized by another call request. When an idle BCH is pointed out it is seized and the scanning is stopped. If no idle BCH is found, the search process is stopped for that HG.

If a first mode was used (i.e. without the second mode of the invention) as illustrated with FIG. 15, the following problems would arise. The availability of CICs/channels would depend on availability of the centralized master object that is allocated on one blade for each route (set of CICs/channels). Re-assignment of the master role may happen for various reasons, especially outage of the blade currently hosting the master role and improvement of the balancing of processing load amongst the blades. During the re-assignment phase, the route master $12m$-$rm$ can not be contacted by call controllers $12c$-$cc$ to seize or release CICs/channels. This period of time depends on processing capabilities of the blades 12 and may for instance be in the range of seconds. When several blades 12 perform restart at about the same time or when inter-blade communication becomes congested, master outage may last longer.

Therefore, if a first mode was used (i.e. without the second mode of the invention), no new calls could be set up that require a CIC/channel maintained by a master that is not available. The duration of this scenario is counted as trunk downtime.

The second mode of operation, in one embodiment of the invention, allows call control on any blade 12 to set up and release new calls during unavailability of the master role. Circuit requests for new calls are served locally on the blade 12*c* with circuits that have become free due to call termination.

Figure 16:
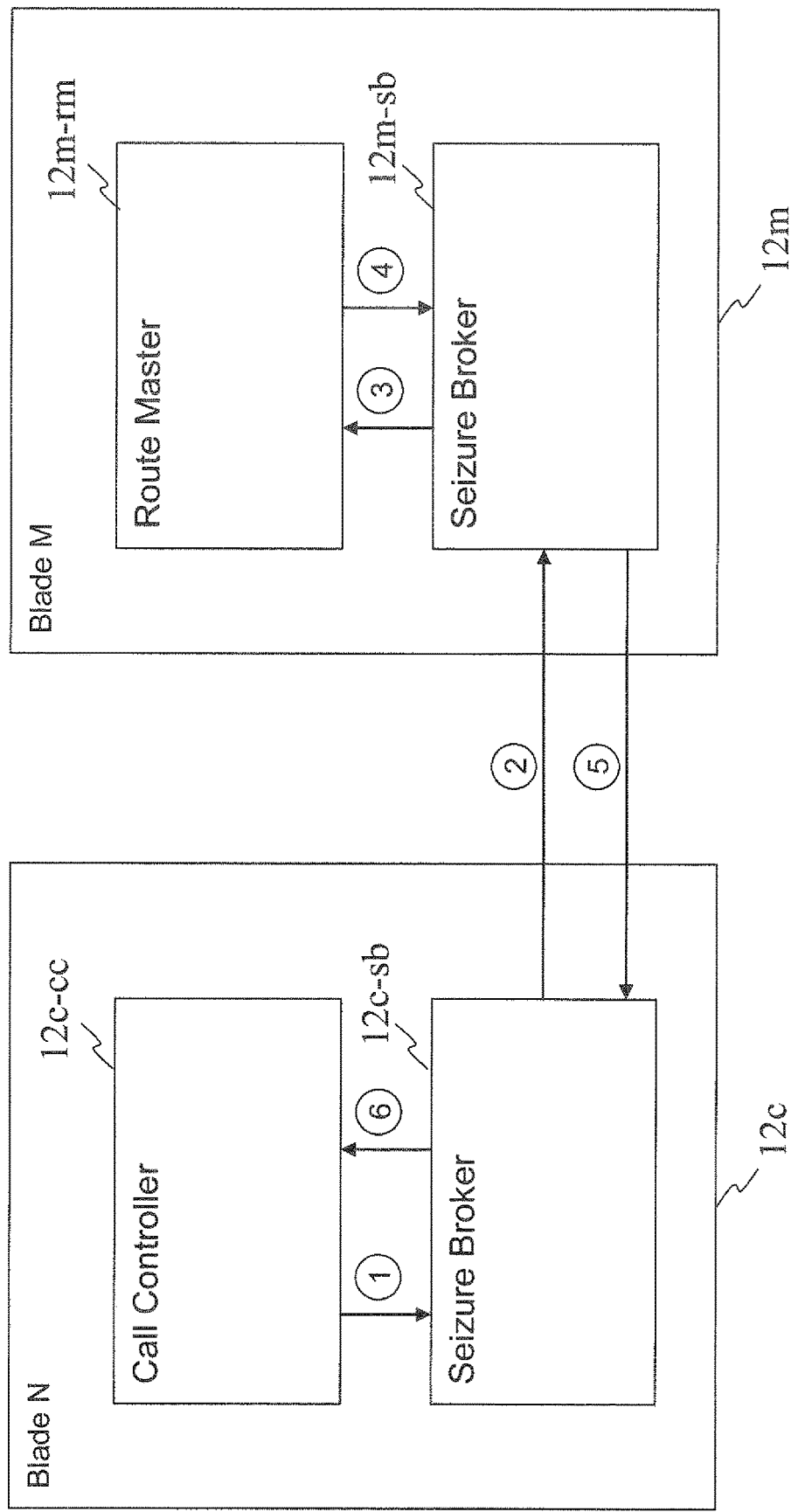
FIG. 16 schematically illustrates a controller (blade N) and a blade (blade M) hosting a master role, wherein the controller operates non-exclusively in the first mode, in one embodiment of the invention.

With reference to FIG. 16 (first mode in an embodiment of the invention where first and second modes of operation are configured to be available), the seizure broker 12*c-sb* on the call controlling blade 12*c* or controller 12*c* (labelled "Blade N" on FIG. 16) receives CIC/channel seizure requests from the call controller 12*c-cc* (depicted by surrounded label "1"). If a master role is assigned and reachable, the seizure broker 12*c-sb* forwards the request to the blade 12*m* hosting the master role (blade labelled "Blade M"). It forwards the reply back to the call controller 12*c-cc*. If the route had any CICs/channels free, the reply contains a CIC/channel.

The interface depicted by surrounded label "1" may be configured so that whether the master role is hosted on a different blade 12*m* (illustrated in FIG. 16) or on the same blade 12*mc* (not illustrated in FIG. 16, but on FIG. 8) is not exposed to the call controller 12*c-cc*. The seizure broker 12*c-sb* provides means for seizure and release of resources 22 to the call controller 12*c-cc*.

The procedure for seizure of resources 22 in the first mode is illustrated in FIG. 16. Upon reception of a seizure request (surrounded label "1"), the seizure broker 12*c-sb* forwards (surrounded label "2") the seizure request towards its peer seizure broker 12*m-sb* on the blade 12*m* hosting the master role. The seizure broker 12*m-sb* contacts (surrounded label "3") the route master 12*m-rm*, requesting the seizure, i.e. reservation, of a resource 22. The route master 12*m-rm* selects an available resource according to the selection type (as explained above), reserves it and passes the information back (surrounded label "4") to the co-located broker 12*m-sb*, which in turn passes it back (surrounded label "5") to the seizure broker 12*c-sb*, located on the call-controlling blade 12*c*. The local broker 12*c-sb* provides (surrounded label "6"), to the call controller 12*c-cc*, an identifier of the requested resource 22.

The first mode procedure for release of resources 22 may also be explained with reference to FIG. 16. Upon reception of a release request (surrounded label "1"), the seizure broker 12*c-sb* forwards (surrounded label "2") the release request towards its peer seizure broker 12*m-sb* on the blade 12*m* hosting the master role. The seizure broker 12*m-sb* contacts (surrounded label "3") the route master 12*m-rm*, requesting release of a resource 22. The route master 12*m-rm* links the resource 22 back to the pool of idle resources and passes a confirmation back (surrounded label "4") to the co-located broker 12*m-sb*, which in turn passes it back (surrounded label "5") to the seizure broker 12*c-sb*, located on the call-controlling blade 12*c*. The seizure broker 12*c-sb* replies (surrounded label "6"), to the call controller 12*c-cc*, with an acknowledgement.

Optionally, in order to reduce inter-blade communication, the seizure broker 12*c-sb* co-located with the call controller 12*c-cc* may directly acknowledge release of resource to the call controller 12*c-cc*. Sending of release requests to the blade 12*m* hosting the master role may thus be handled in a decoupled way, not affecting and not being visible to the controller 12*c*.

Figure 17:
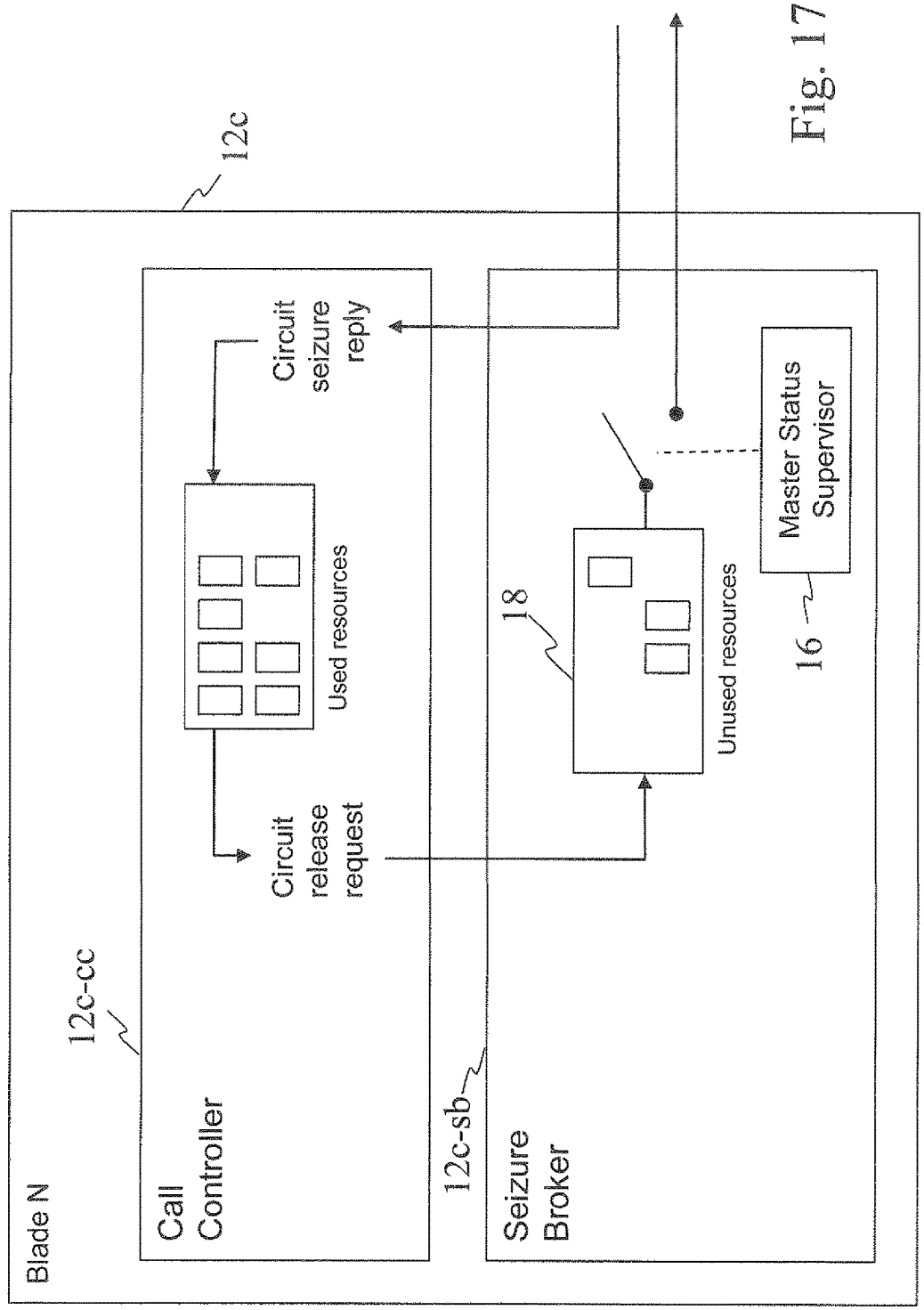
FIG. 17 schematically illustrates a controller (blade N) operating in a first mode.

FIG. 17 illustrates the circuit usage flow during the first mode and shows how, in one embodiment, the seizure broker 12*c-sb* maintains a local buffer 18 of resources 22 (more precisely resource identifiers) that have been released by the call controller 12*c-cc*. The seizure broker 12*c-sb* sends bulk release request messages to the blade 12*m* hosting the master role when the master status supervisor 16 detects that the master role is assigned and reachable and further conditions are met. These conditions may be a filling threshold and a time supervision: The bulk message should be sent when the filling level has reached a certain threshold or after a certain maximum duration, whatever condition is met first.

If a first mode was used, seizure requests could not be served to the call controller 12*c-cc* if the blade 12*m* hosting the master role is not reachable or if the master role has temporarily not been assigned or is being moved.

The second mode, which can also be referred to as autonomous working mode (to refer to the controller 12*c* acting in an autonomous manner for reservation and release of resources), applies when seizure requests cannot be served to the call controller 12*c-cc* because the blade 12*m* hosting the master role is not reachable or because the master role has temporarily not been assigned or is being moved. Optionally, the second mode can also be applied when seizure requests have been rejected by the blade 12*m* hosting the master role, because the route master 12*m-rm* has run out of available resources 22 but the buffer 18 of the seizure broker 12*c-sb* still contains such resources 22.

Figure 18:
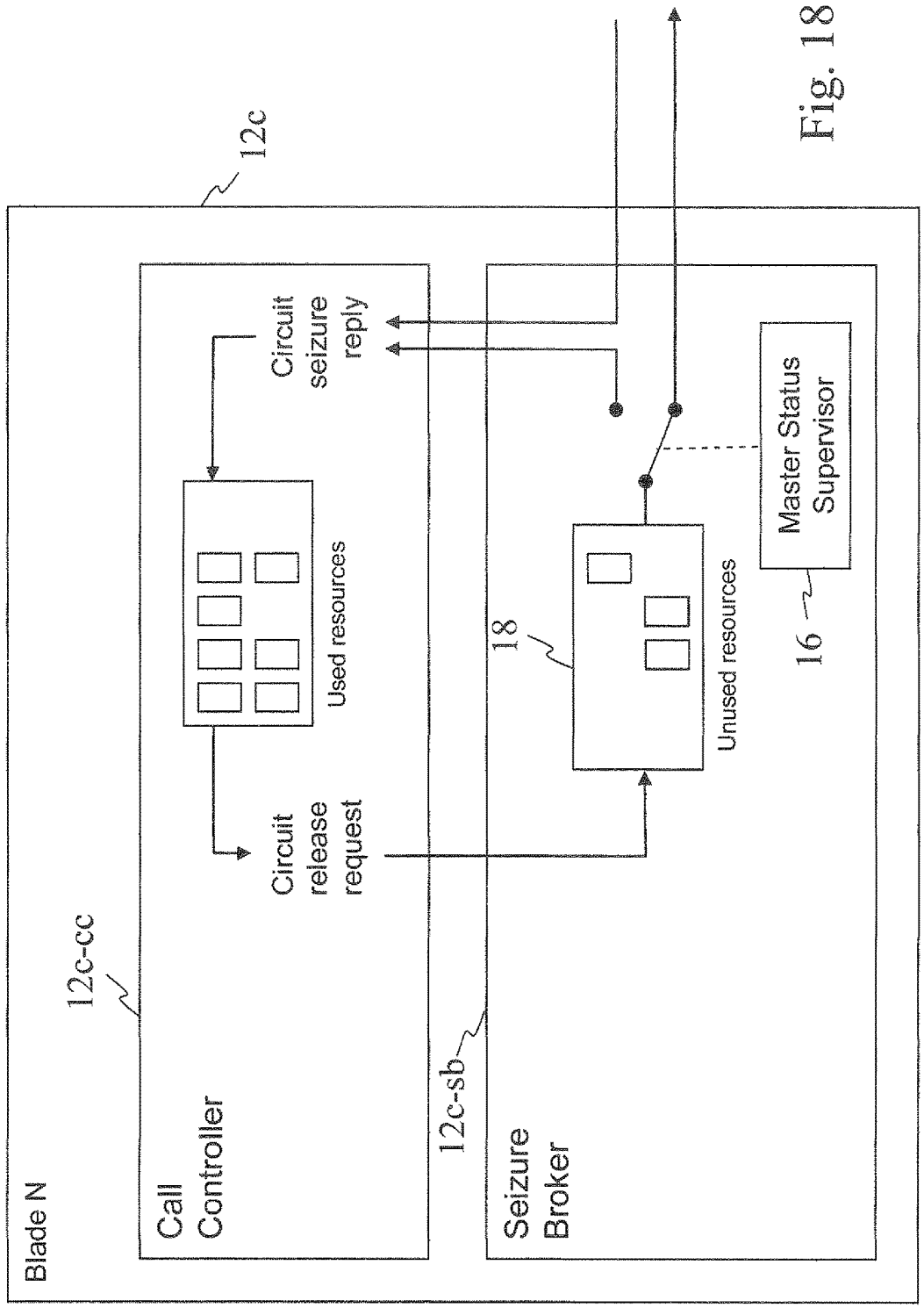
FIG. 18 schematically illustrates a controller configured to operate both in a first and second mode, in one embodiment of the invention.

FIG. 18 illustrates the circuit usage flow during second mode.

In the second mode, the seizure broker 12*c-sb* co-located with the call controller 12*c-cc* serves the seizure request received from the call controller 12*c-cc* by means of the local buffer 18, without contacting any other blade: The seizure broker 12*c-sb* removes an idle resource from the local buffer 18 and provides it in the seizure request reply to the call controller 12*c-cc*. The master status supervisor 16 is in charge of sending release requests to the processing unit 12*m* hosting the master role, when it is detected that a master role is assigned to a processing unit 12*m* and the processing unit 12*m* is available to receive and release requests for the controller 12*c*.

This method is compatible with random selection policies and for applications (such as A-interface) where the selection type is not used as a means to prevent dual seizures. The node behaviour differs, especially for trunk and PRA, between first mode and second mode when a selection type with non-random selection policy is configured.

The selection types for the second mode operation may be described as follows.

In the context of ISUP and BICC, the selection types available for trunk traffic can be modified to work on blade level instead of node level. The following table shows the selection types for second mode operation in comparison to the selection types for first mode operation.

| Selection type for first mode operation | Selection type for second mode operation |
| --- | --- |
| ITU-T method 2 (Random selection). | Random selection of a device in the local buffer 18 of unused resources for the route. |
| ITU-T method 1 (Sequential selection), forward/backward search. Forward/backward search means that a search for an idle device in the route is started from the lowest/highest device number. | The release buffer 18 of the blade 12c is searched for an idle device in the local buffer 18 of unused resources for the route, starting from the lowest/highest device number. |
| CIC-based Circular selection, forward/backward search. Forward/backward search means that a search for an idle device in the route is started from current position and executed towards higher/lower CIC number. | The release buffer 18 of the blade 12c is searched for an idle device in the local buffer 18 of unused resources for the route, starting from current position and executed towards higher/lower CIC number. |
| CIC-based Sequential selection starting at lowest/highest CIC. Search for an idle device in the route is started from the lowest/highest CIC number. | The release buffer 18 of the blade 12c is searched for an idle device in the local buffer 18 of unused resources for the route, starting from the lowest/highest CIC number. |

In the context of A-interface circuits, for BSSMAP routes, available resources are found by means of a FIFO idle list. In second mode list 14, the blade 12*c* operates with its own idle list for each route. The idle list comprises the CICs that are contained in the local buffer 18 of unused resources for the route.

On the A-interface, circuits are always selected by the MSC-S, never by the BSC. Therefore, no collision risk exists.

In the context of PRA B-channels, for PRA originating calls, there is a high likelihood that a channel selected by the PRA is not in the buffer of unused resources 22, because it may not have been used in the node or may have been used by a different blade at the time that said blade entered the second mode. The blade 12*c* operating in second mode would have no means to tell if the circuit is idle and it could not seize it from the blade 12*m* hosting the master role. If such circuit is selected by the PRA and any alternative is indicated as acceptable in the setup message, then the controller 12*c* can choose a channel from the blade local buffer of unused resources for the access. If no alternative is indicated as acceptable then the call must be disconnected. If any channel is indicated as acceptable, the SC-S chooses a channel from the blade local buffer 18 of unused resources for the access.

For PRA terminating calls, the SC-S should indicate to the access that no alternative is acceptable. Otherwise, there is a risk that the PRA selects a channel that is not contained in the local buffer 18 of unused resources 22. The blade 12*c* operating in second mode would have no means to tell if the circuit is idle and it could not seize it from the blade 12*m* hosting the master role. The call would have to be released.

Hunting methods may be supported in the second mode. The set of available channels is limited to the ones that are included in the blade local buffer 18 of unused resources. The hunting can not take channel selections performed by other blades into consideration, therefore the node level behaviour may possibly not conform to the configured hunting method.

A skilled person would realize that the introduction of the second mode reduces trunk/line downtime during the time that the master role, for maintaining the common pool of resources, is not available, e.g. due to blade outage or during move of roles between blades 12.

The physical entities according to the invention, including the blades, may comprise or store computer programs including instructions such that, when the computer programs are executed on the physical entities, steps and procedures according to one embodiment of the invention are carried out. The invention also relates to such computer programs for carrying out methods according to the invention, and to any computer-readable medium storing the computer programs for carrying out methods according to the invention.

Where the terms "call controller", "seizure broker" and "master status supervisor" are used herein, no restriction is made regarding how distributed these elements of a processing unit 12 may be and regarding how gathered elements may be. That is, the constituent elements of a processing unit 12 may be distributed in different software or hardware components or devices (within a processing unit 12 or blade 12) for bringing about the intended function. A plurality of distinct elements may also be gathered for providing the intended functionalities.

Any one of the above-referred elements of a processing unit 12 or blade 12 may be implemented in hardware, software, field-programmable gate array (FPGA), application-specific integrated circuit (ASICs), firmware or the like.

In further embodiments of the invention, any one of the above-mentioned call controller, seizure broker and master status supervisor is replaced by call controlling means, seizure brokering means or master status supervising means, or by a call controlling unit, a seizure brokering unit or a master status supervising unit, for performing the functions of the call controller, seizure broker or master status supervisor respectively.

In further embodiments of the invention, any one of the above-described procedures, such as the assigning procedure, portions of procedure and/or steps may be implemented using computer-readable instructions, for instance in the form of computer-understandable procedures, methods or the like, in any kind of computer languages (such as in C, C++, Java, Assembler, Visual Basic or the like), and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A network node for controlling at least one set of resources in a communication network,
   the node including two or more processing units;
   the node being configured, for each set of resources, to assign to each of the two or more processing units at least one of a master role, including reserving and releasing the resources, and a controller role, including controlling the resources, each of said processing units that is assigned a controller role being herein referred to as a controller;
   each controller being configured
      to operate in a first mode when a master role is assigned to one of the processing units and said processing unit assigned said master role is available to reserve and release the resources for the controller;
      to operate in a second mode when no master role is assigned to any one of the processing units or when a master role is assigned to one of the processing units but said processing unit assigned said master role is not available to reserve and release the resources for the controller; and
      when operating in the second mode, to maintain a list of the resources requested to be released by the controller, and to select one of the resources from the list when one resource is requested to be reserved by the controller.

2. The network node of claim 1, wherein the network node comprises a switching center in a signaling plane of the communication network for controlling at least one set of resources in a user plane of the communication network.

3. The network node of claim 1, wherein the resources comprise one of:
   physical carriers; and
   circuits or channels of a circuit-switched bearer network.

4. The network node of claim 1, further comprising a blade cluster including the two or more processing units, wherein each of the two or more processing units comprises a blade of the blade cluster.

5. The network node of claim 4, wherein each blade of the blade cluster further includes at least one memory unit.

6. The network node of claim 5, wherein the list is stored on the at least one memory unit of the corresponding blade.

7. The network node of claim 1, wherein each controller is further configured, when operating in the second mode, to remove the selected resource from the list after having selected one of the resources from the list.

8. The network node of claim 1, wherein each controller is further configured, when operating in the second mode and when detecting that a master role is assigned to one of the processing units and that said processing unit assigned said master role is available to reserve and release the resources for the controller:
to send, to the processing unit to which the master role is assigned, a release request, with respect to each one of the resources in the list; and
to remove the resources from the list.

9. A method for controlling, by a network node, at least one set of resources in a communication network, the node including two or more processing units, the method comprising:
assigning, by the node, for each set of resources to each of the two or more processing units at least one of a master role, including reserving and releasing the resources, and a controller role, including controlling the resources, each of said processing units that is assigned a controller role being herein referred to as a controller,
each controller operating in a first mode when a master role is assigned to one of the processing units and said processing unit assigned the master role is available to reserve and release the resources for the controller;
each controller operating in a second mode when no master role is assigned to any one of the processing units or when a master role is assigned to one of the processing units but said processing unit assigned the master role is not available to reserve and release the resources for the controller; and
when operating in the second mode, each controller maintaining a list of the resources requested to be released by the controller, and selecting one of the resources from the list when one resource is requested to be reserved by the controller.

10. The method of claim 9, wherein the node comprises a switching center in a signaling plane of the communication network for controlling at least one set of resources in a user plane of the communication network.

11. The method of claim 9, wherein the resources comprise one of:
physical carriers; and
circuits or channels of a circuit-switched bearer network.

12. The method of claim 9, wherein the node includes a blade cluster including the two or more processing units, wherein each of the two or more processing units comprises a blade of the blade cluster.

13. The method of claim 12, wherein each blade of the blade cluster further includes at least one memory unit.

14. The method of claim 13, further comprising storing the list on the at least one memory unit of the corresponding blade.

15. The method of claim 9, further comprising each controller removing the selected resource from the list after having selected one resource from the list when operating in the second mode.

16. The method of claim 9, wherein each controller, when operating in the second mode and when detecting that a master role is assigned to one of the processing units and that said processing unit assigned the master role is available to reserve and release the resources for the controller:
sending, to the processing unit to which the master role is assigned a release request with respect to each one of the resources in the list; and
removing the resources from the list.

17. A non-transitory computer readable medium comprising instructions configured, when executed on a network node including at least two processing units, to cause the node to assign to each of the two or more processing units at least one of a master role, including reserving and releasing the resources, and a controller role, including controlling the resources, each of said processing units that is assigned a controller role being herein referred to as a controller, said instructions further configuring each controller:
to operate in a first mode when a master role is assigned to one of the processing units and said processing unit assigned said master role is available to reserve and release the resources for the controller;
to operate in a second mode when no master role is assigned to any one of the processing units or when a master role is assigned to one of the processing units but said processing unit assigned said master role is not available to reserve and release the resources for the controller; and
when operating in the second mode, to maintain a list of the resources requested to be released by the controller, and to select one of the resources from the list when one resource is requested to be reserved by the controller.

18. The non-transitory computer readable medium of claim 17, wherein the node includes a blade cluster including the two or more processing units, wherein each of the two or more processing units comprises a blade of the blade cluster.

19. The non-transitory computer readable medium of claim 17, wherein the instructions are further configured, when operating in the second mode, to remove the selected resource from the list after having selected one of the resources from the list.

20. The non-transitory computer readable medium of claim 17, wherein each controller, when operating in the second mode and when detecting that a master role is assigned to one of the processing units and that said processing unit assigned the master role is available to reserve and release the resources for the controller, wherein the instructions are further configured to:
send, to the processing unit to which the master role is assigned a release request with respect to each one of the resources in the list; and
remove the resources from the list.

* * * * *